(12) United States Patent
Chung et al.

(10) Patent No.: US 11,995,794 B2
(45) Date of Patent: May 28, 2024

(54) DEVICE FOR GENERATING A HIGH-RESOLUTION FRAME

(71) Applicants: SK hynix Inc., Icheon (KR); Seoul National University R&DB Foundation, Seoul (KR)

(72) Inventors: Haesoo Chung, Seongnam (KR); Sang-hoon Lee, Seoul (KR); Nam Ik Cho, Seoul (KR)

(73) Assignees: SK hynix Inc., Icheon (KR); Seoul National University R&DB Foundation, Seoul (KR)

(*) Notice: Subject to any disclaimer, the term of this patent is extended or adjusted under 35 U.S.C. 154(b) by 279 days.

(21) Appl. No.: 17/402,337

(22) Filed: Aug. 13, 2021

(65) Prior Publication Data
US 2022/0343462 A1    Oct. 27, 2022

(30) Foreign Application Priority Data

Apr. 22, 2021 (KR) .................. 10-2021-0052299

(51) Int. Cl.
| | |
|---|---|
| G06N 3/045 | (2023.01) |
| G06N 3/08 | (2023.01) |
| G06T 3/4046 | (2024.01) |
| G06T 5/50 | (2006.01) |
| G06T 7/33 | (2017.01) |

(52) U.S. Cl.
CPC .......... *G06T 3/4046* (2013.01); *G06N 3/045* (2023.01); *G06N 3/08* (2013.01); *G06T 5/50* (2013.01); *G06T 7/337* (2017.01); *G06T 2207/20024* (2013.01); *G06T 2207/20081* (2013.01); *G06T 2207/20084* (2013.01); *G06T 2207/20221* (2013.01)

(58) Field of Classification Search
CPC .................................................... G06T 3/4046
See application file for complete search history.

(56) References Cited

U.S. PATENT DOCUMENTS

| | | |
|---|---|---|
| 6,650,704 B1 | 11/2003 | Carlson et al. |
| 2018/0137603 A1* | 5/2018 | Hsiao ........................ G06T 7/90 |
| 2020/0250794 A1* | 8/2020 | Zimmer ................ G06T 3/4069 |
| 2020/0294217 A1 | 9/2020 | El-Khamy et al. |
| 2020/0302249 A1* | 9/2020 | Liu .......................... G06N 3/08 |
| 2021/0097297 A1* | 4/2021 | Ren ........................ G06N 3/047 |
| 2022/0222776 A1* | 7/2022 | Porikli .................... G06T 7/248 |

OTHER PUBLICATIONS

R. Liao, et al. "Video super-resolution via deep draft-ensemble learning," in ICCV, 2015, pp. 531-539.

(Continued)

*Primary Examiner* — Oneal R Mistry

(57) ABSTRACT

A device for generating a high-resolution frame includes a plurality of alignment circuits configured to generate a plurality of aligned frames by blending a reference frame and a plurality of neighboring frames neighboring the reference frame; and a reconstruction circuit configured to generate the high-resolution frame corresponding to the reference frame according to the reference frame and the plurality of aligned frames. The plurality of alignment circuits and the reconstruction circuit each include neural networks.

10 Claims, 3 Drawing Sheets

(56) References Cited

OTHER PUBLICATIONS

D. Li, et al., "Video superresolution via motion compensation and deep residual learning," IEEE Trans. Comput. Imag., vol. 3, No. 4, pp. 749-762, 2017.

M.S. Sajjadi, et al., "Frame-recurrent video super-resolution," in CVPR, 2018, pp. 6626-6634.

T. Xue, et al., "Video enhancement with task-oriented flow," Int. J. Comput. Vis., vol. 127, No. 8, pp. 1106-1125, 2019.

C. Liu, "Beyond pixels: exploring new representations and applications for motion analysis," PhD thesis, Massachusetts Institute of Technology, 2009.

Z. Chen, et al., "Large displacement optical flow from nearest neighbor fields," in CVPR, 2013, pp. 2443-2450.

W. Shi et al., "Real-time single image and video super-resolution using an efficient sub-pixel convolutional neural network," in CVPR, 2016, pp. 1874-1883.

J. Caballero et al., "Real-time video super-resolution with spatio-temporal networks and motion compensation," in CVPR, 2017, pp. 4778-4787.

D. Liu et al., "Robust video super-resolution with learned temporal dynamics," in ICCV, 2017, pp. 2526-2534.

M. Jaderberg, et al., "Spatial transformer networks," in NIPS, 2015, pp. 2017-2025.

M. Haris, et al., "Recurrent back-projection network for video super-resolution," in CVPR, 2019, pp. 3897-3906.

Y. Jo, et al., "Deep video super-resolution network using dynamic upsampling filters without explicit motion compensation," in CVPR, 2018, pp. 3224-3232.

P. Yi, et al., "Progressive fusion video super-resolution network via exploiting non-local spatio-temporal correlations," in ICCV, 2019, pp. 3106-3115.

L. Xu, et al., "Motion detail preserving optical flow estimation," IEEE Trans. Pattern Anal. Mach. Intell., vol. 34, No. 9, pp. 1744-1757, 2012.

M. Drulea, et al., "Total variation regularization of local-global optical flow," in ITSC, 2011, pp. 318-323.

X. Tao, et al., "Detail-revealing deep video super-resolution," in ICCV, 2017, pp. 22-29.

C. Liu, et al., "A bayesian approach to adaptive video super resolution," in CVPR, 2011, pp. 209-216.

Z. Wang et al., "Multi-memory convolutional neural network for video super-resolution," IEEE Trans. Image Process., vol. 28, No. 5, pp. 2530-2544, 2019.

J. Pan, et al., "Cascaded Deep Video Deblurring Using Temporal Sharpness Prior," 2020 IEEE/CVF Conference on Computer Vision and Pattern Recognition (CVPR), 2020, pp. 3040-3048.

K. He, et al., "Deep Residual Learning for Image Recognition," 2016 IEEE Conference on Computer Vision and Pattern Recognition (CVPR), 2016, pp. 770-778.

G. Cheng, et al., "Encoder-Decoder Residual Network for Real Super-Resolution," 2019 IEEE/CVF Conference on Computer Vision and Pattern Recognition Workshops (CVPRW), 2019, pp. 2169-2178.

P. Isola, et al., "Image-to-Image Translation with Conditional Adversarial Networks," 2017 IEEE Conference on Computer Vision and Pattern Recognition (CVPR), 2017, pp. 5967-5976.

O. Ronneberger et al. "U-Net: Convolutional Networks for Biomedical Image Segmentation". In: Navab N., Hornegger J., Wells W., Frangi A. (eds) Medical Image Computing and Computer-Assisted Intervention—MICCAI 2015.

Y.-S. Xu, et al., "Unified Dynamic Convolutional Network for Super-Resolution With Variational Degradations," 2020 IEEE/CVF Conference on Computer Vision and Pattern Recognition (CVPR), 2020, pp. 12493-12502.

A. Kappeler, et al., "Video super-resolution with convolutional neural networks," IEEE Trans. Comput. Imag., vol. 2, No. 2, pp. 109-122, 2016.

* cited by examiner

DEVICE FOR GENERATING A HIGH-RESOLUTION FRAME

CROSS-REFERENCE TO RELATED APPLICATION

The present application claims priority under 35 U.S.C. § 119(a) to Korean Patent Application No. 10-2021-0052299, filed on Apr. 22, 2021, which is incorporated herein by reference in its entirety.

BACKGROUND

1. Technical Field

Various embodiments generally relate to a device for generating a high-resolution frame from low-resolution frames.

2. Related Art

A conventional device for generating a high-resolution frame generates a high-resolution frame by using a low-resolution frame and neighboring frames thereof.

The conventional device generates a high-resolution frame by simply combining the low-resolution frame and the neighboring frames.

However, quality of the high-resolution frame is deteriorated because of many unnatural artifacts generated during the conventional combining operation.

SUMMARY

In accordance with an embodiment of the present disclosure, a device for generating a high-resolution frame may include a plurality of alignment circuits, each alignment circuit configured to generate a respective aligned frame of a plurality of aligned frames by blending a reference frame and a respective neighboring frame of a plurality of neighboring frames neighboring the reference frame using a respective first neural network; and a reconstruction circuit configured to generate the high-resolution frame corresponding to the reference frame according to the reference frame and the plurality of aligned frames using a second neural network.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to illustrate various embodiments, and explain various principles and advantages of those embodiments.

DETAILED DESCRIPTION

The following detailed description references the accompanying figures in describing illustrative embodiments consistent with this disclosure. The embodiments are provided for illustrative purposes and are not exhaustive. Additional embodiments not explicitly illustrated or described are possible. Further, modifications can be made to presented embodiments within the scope of teachings of the present disclosure. The detailed description is not meant to limit this disclosure. Rather, the scope of the present disclosure is defined in accordance with claims and equivalents thereof. Also, throughout the specification, reference to "an embodiment" or the like is not necessarily to only one embodiment, and different references to any such phrase are not necessarily to the same embodiment(s).

Figure 1:
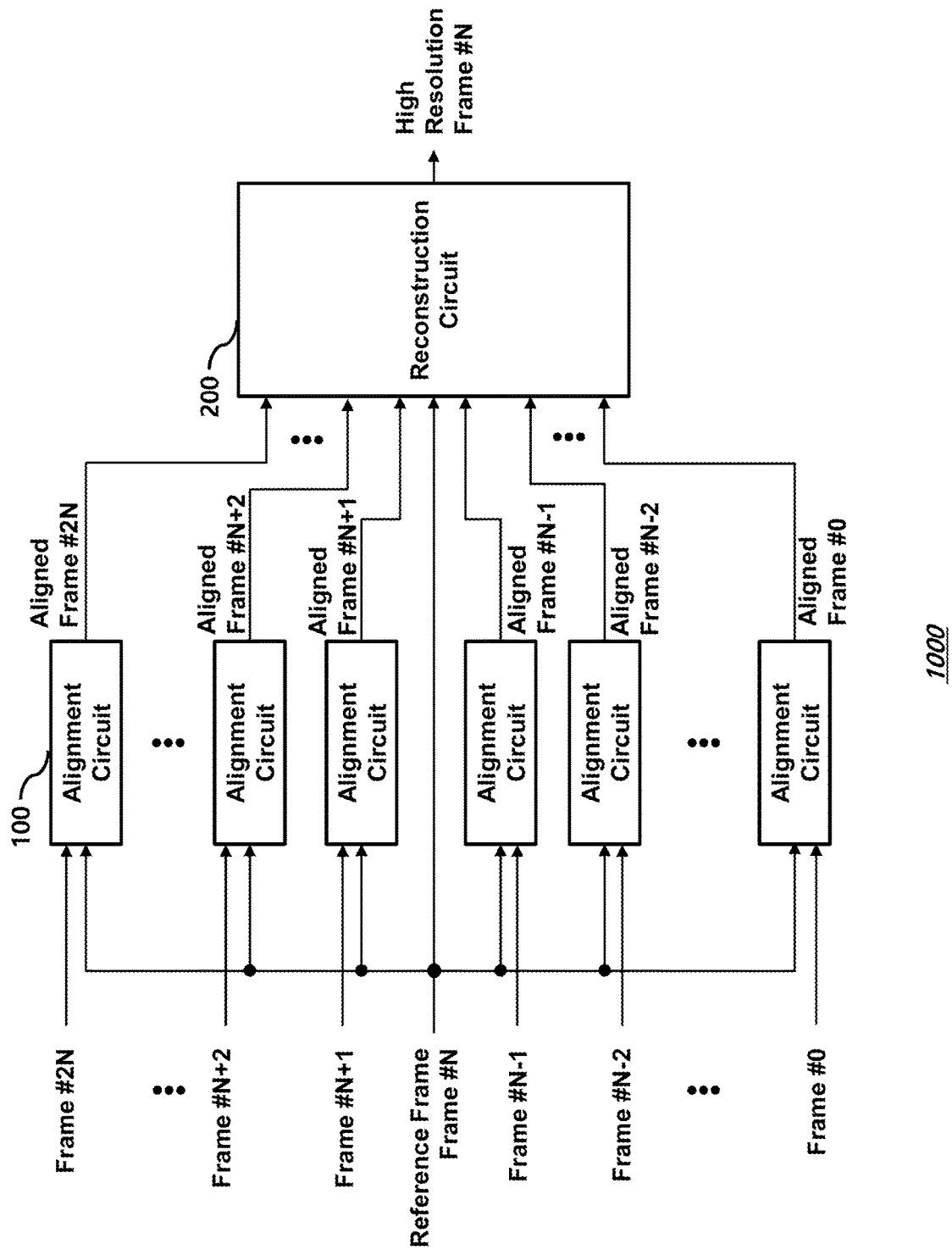
FIG. 1 illustrates a device for generating a high-resolution frame according to an embodiment of the present disclosure.

FIG. 1 illustrates a device 1000 for generating a high-resolution frame according to an embodiment of the present disclosure.

The device 1000 generates a high-resolution frame corresponding to a reference frame by using the reference frame and a plurality of frames neighboring the reference frame. In embodiments, the reference frames and the plurality of frames neighboring the reference frame may be sequential frames in a temporally-related sequence of frames, such as a motion picture or a video.

In FIG. 1, there are 2N frames neighboring the reference frame as an example, where N is a natural number greater than 1.

The device 1000 includes a reconstruction circuit 200 and 2N alignment circuits 100.

In FIG. 1, the N-th frame may be referred to as a reference frame, and 2N frames neighboring the reference frame may be referred to as neighboring frames or supporting frames.

All of the alignment circuits 100 have substantially the same configuration, and each receives the reference frame and a respective one of the neighboring frames and outputs a respective aligned frame.

The reconstruction circuit 200 receives the reference frame and 2N aligned frames and generates the high-resolution frame corresponding to the reference frame.

The reference frame and the 2N aligned frames may be concatenated and input to the reconstruction circuit 200.

Figure 2:
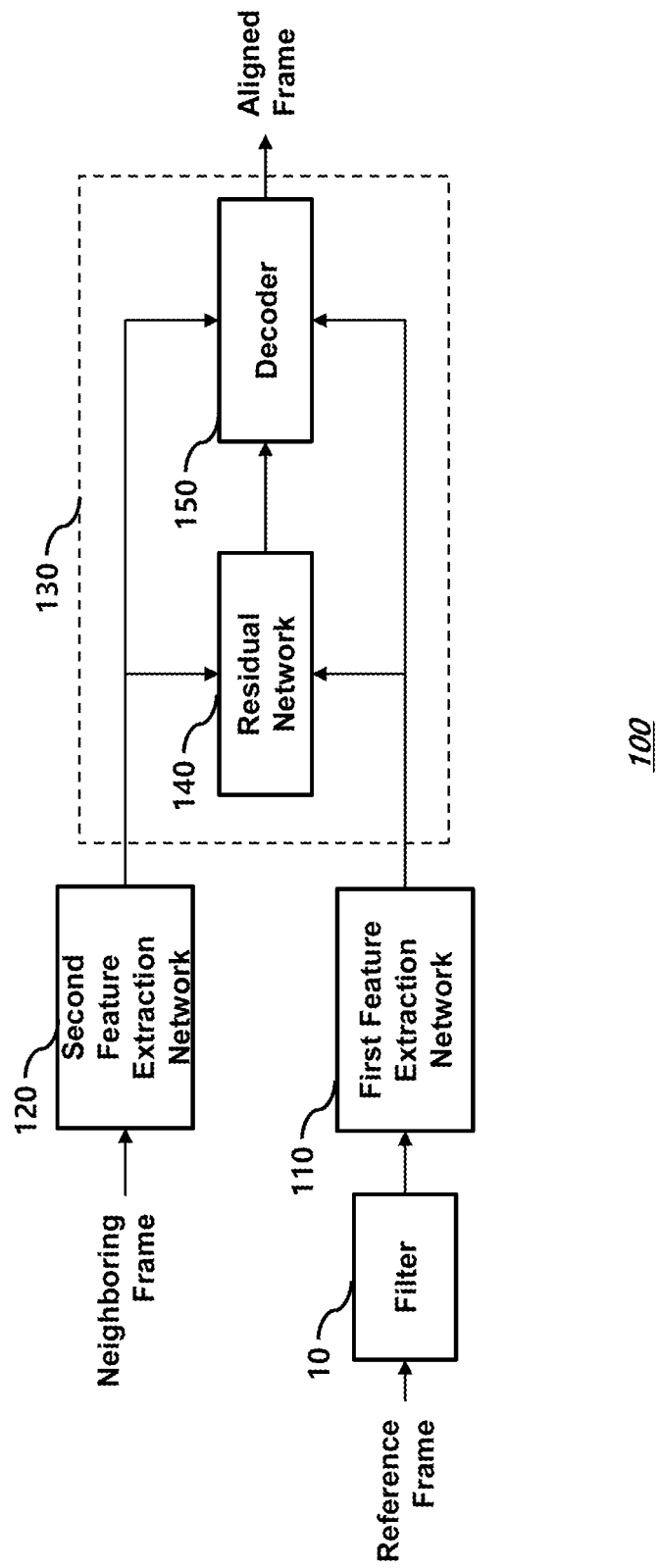
FIG. 2 illustrates an alignment circuit according to an embodiment of the present disclosure.

FIG. 2 illustrates an alignment circuit 100 according to an embodiment of the present disclosure.

The alignment circuit 100 includes a first feature extraction network 110, a second feature extraction network 120, and a feature blending circuit 130.

The first feature extraction network 110 extracts a first feature by encoding the reference frame.

The first feature is characteristic information related to the structure information of the reference frame.

The second feature extraction network 120 extracts the second feature by encoding a neighboring frame.

The second feature is related to detail information included in the neighboring frame in addition to the structure information of the reference frame.

The feature blending circuit 130 generates an aligned frame by blending the first feature and the second feature.

Therefore, the alignment circuit 100 may be referred as a detail-structure blending circuit or a detail-structure blending network.

In the illustrated embodiment, the information blending circuit 130 includes a residual network 140 that blends the first feature and the second feature, and a decoder 150 that reconstructs an aligned frame from an output of the residual network 140. In an embodiment, the residual network 230 includes a residual neural network. The residual neural network itself is well known by the articles such as [K. He, X. Zhang, S. Ren and J. Sun, "Deep Residual Learning for Image Recognition," 2016 IEEE Conference on Computer Vision and Pattern Recognition (CVPR), 2016, pp. 770-778, doi: 10.1109/CVPR.2016.90.], therefore detailed description thereof will be omitted.

The decoder 150 may additionally receive the first feature and the second feature directly from the first feature extraction network 110 and the second feature extraction network 120. The decoder 150 increases spatial size of input feature to output the aligned frame. A neural network used for the decoder 150 is well known by the articles such as [Ronneberger O., Fischer P., Brox T. (2015) U-Net: Convolutional Networks for Biomedical Image Segmentation. In: Navab N., Hornegger J., Wells W., Frangi A. (eds) Medical Image Computing and Computer-Assisted Intervention—MICCAI 2015. MICCAI 2015. Lecture Notes in Computer Science, vol 9351. Springer, Cham. https://doi.org/10.1007/978-3-319-24574-4_28.], therefore detailed description thereof will be omitted.

In the embodiment, each of the first feature extraction network 110, the second feature extraction network 120, the residual network 140, and the decoder 150 may include hardware, software, or a combination thereof implementing one or more neural networks such as a convolutional neural network (CNN), whose design may be variously changed by those skilled in the art.

The present embodiment may further include a filter 10 that filters the reference frame and provides an output thereof to the first feature extraction network 110.

The filter 10 may be used during a training operation. In embodiments, the filter 10 is bypassed or operates in a pass-thru mode when the training operation is not being performed.

For example, the filter 10 may be a 3×3 median filter, which blurs the reference frame and provides an output thereof to the first feature extraction network 110.

The training operation for the neural network is performed to minimize a first loss function L1 of Equation 1 below.

$$L_1 = \|A_1 - A_T\|$$ (Equation 1)

In Equation 1, $A_1$ corresponds to an aligned frame output when the reference frame and one neighboring frame are input, and $A_T$ corresponds to an actual aligned frame corresponding the aligned frame. In this embodiment, the reference frame corresponds to the actual aligned frame when performing the training operation.

When the reference frame is directly input to the first feature extraction network 110, the aligning circuit 100 may be trained so that it depends only on the reference frame; that is, the aligning circuit 100 may be trained to ignore the neighboring frame. Therefore, in this embodiment, the reference frame is provided to the filter 10 and an output thereof is provided to the first feature extraction network 110 during training of the aligning circuit 100.

Accordingly, the alignment circuit 100 may be trained to use both the reference frame and the neighboring frame.

Figure 3:
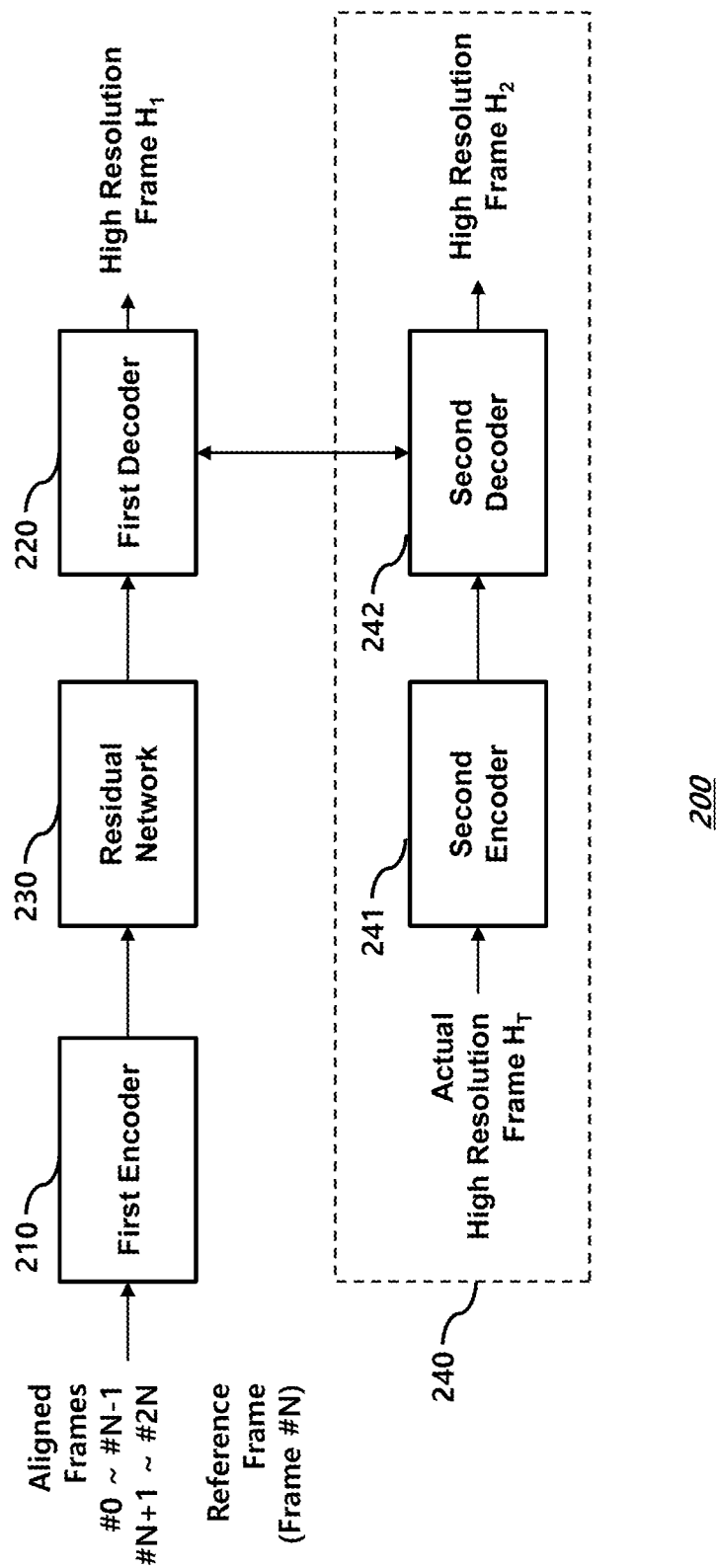
FIG. 3 illustrates a reconstruction circuit according to an embodiment of the present disclosure.

FIG. 3 illustrates a reconstruction circuit 200 according to an embodiment of the present disclosure.

The reconstruction circuit 200 includes a first encoder 210 and a first decoder 220.

The first encoder 210 receives the reference frame and 2N aligned frames.

In this case, the reference frame and the 2N aligned frames may be concatenated and then provided to the first encoder 210.

The first encoder 210 encodes the input frames to extract a feature data, and the first decoder 220 decodes the feature data to generate a high-resolution frame.

The reconstruction circuit 200 may further include a residual network 230.

The residual network 230 processes the feature data output from the first encoder 210 and provides an output thereof to the first decoder 220. In an embodiment, the residual network 230 includes a residual neural network.

The reconstruction circuit 200 may further include a training circuit 240.

The training circuit 240 includes a second encoder 241 and a second decoder 242, and may be used during the training operation to improve performance of the reconstruction circuit 200.

In this embodiment, each of the first encoder 210, the first decoder 220, the residual network 230, the second encoder 241, and the second decoder 242 may include hardware, software, or a combination thereof implementing one or more neural networks such as a convolutional neural network (CNN), whose design may be variously changed by those skilled in the art.

During the training operation, the reference frame and the 2N aligned frames are concatenated and input to the first encoder 210, and the high-resolution frame $H_1$ corresponding thereto is outputted from the first decoder 220.

During the training operation, an actual high-resolution frame $H_T$ is input to the second encoder 241, and a high-resolution frame $H_2$ is output from the second decoder 242.

A set of weights used in the first decoder 220 is referred to as a first feature map F, and a set of weights used in the second decoder 242 is referred to as a second feature map G.

In this case, the reconstruction circuit 200 is trained to minimize the second loss function $L_2$ such as expressed in Equation 2 below.

$$L_2 = \|H_1 - H_T\| + \|H_2 - H_T\| + \|F - G\|$$ (Equation 2)

As described above, the alignment circuit 100 and the reconstruction circuit 200 may be trained individually.

In another embodiment, the alignment circuit 100 and the reconstruction circuit 200 may be trained together.

In this case, the training operation may be performed in a direction in which the overall loss function L of Equation 3 is minimized.

$$L = \sum_{k=0}^{k=2N} L_{1,k} + L_2$$ (Equation 3)

In Equation 3, $L_{1,k}$ denotes a loss function in an alignment circuit 100 using the k-th neighboring frame, and $L_2$ denotes a loss function of the reconstruction circuit 200, such as shown in Equation 2. Since the neighboring frame corresponds to the reference frame when k is N, $L_{1,N}$ becomes 0.

Although various embodiments have been illustrated and described, various changes and modifications may be made to the described embodiments without departing from the spirit and scope of the invention as defined by the following claims.

What is claimed is:

1. A device for generating a high-resolution frame corresponding to a reference frame comprising:
   a plurality of alignment circuits, each alignment circuit configured to generate a respective aligned frame of a plurality of aligned frames by blending the reference frame and a respective neighboring frame of a plurality of neighboring frames neighboring the reference frame using a respective first neural network; and
   a reconstruction circuit configured to generate the high-resolution frame corresponding to the reference frame according to the reference frame and the plurality of aligned frames using a second neural network, wherein the plurality of neighboring frames is a temporality-related sequence of frames, and wherein the plurality of neighboring frames includes at least one past frame of the reference frame and at least one future frame of the reference frame.

2. The device of claim 1, wherein each of the plurality of alignment circuit includes:
   a first feature extraction neural network configured to extract a first feature from the reference frame;
   a second feature extraction neural network configured to extract a second feature from one of the plurality of neighboring frames; and
   a feature blending circuit configured to generate an aligned frame by blending the first feature and the second feature.

3. The device of claim 2, wherein the feature blending circuit comprises:
   a residual neural network configured to blend the first feature and the second feature; and
   a decoder including a neural network and configured to generate the aligned frame with an output of the residual circuit.

4. The device of claim 3, wherein the decoder further receives the first feature and the second feature to generate the aligned frame.

5. The device of claim 2, wherein the alignment circuit further includes a filter for filtering the reference frame and provides an output thereof to the first feature extraction neural network.

6. The device of claim 1, wherein the reconstruction circuit includes:
   a first encoder including a neural network and configured to extract a feature data by encoding the reference frame and the plurality of aligned frames; and
   a first decoder including a neural network and configured to generate the high-resolution frame by decoding the feature data.

7. The device of claim 6, wherein the reconstruction circuit further includes a residual neural network configured to process the feature data and to provide output thereof to the first decoder.

8. The device of claim 6, wherein the reconstruction circuit further includes a training circuit, wherein the training circuit contributes adjusting weights of the first decoder during a training operation.

9. The device of claim 8, wherein the training circuit includes:
   a second encoder including a neural network and configured to receive an actual high-resolution frame; and
   a second decoder including a neural network and configured to generate a high-resolution frame by decoding an output of the second decoder.

10. The device of claim 9, wherein a loss function corresponding to distance between a first feature map including weights of the first decoder and a second feature map including weights of the second decoder is minimized during the training operation.

* * * * *